United States Patent
Watanabe et al.

[11] Patent Number: 5,959,701
[45] Date of Patent: *Sep. 28, 1999

[54] PROJECTION TYPE DISPLAY DEVICE

[75] Inventors: Toru Watanabe; Ichiro Matsuzaki, both of Niigata, Japan

[73] Assignee: Kuraray Co., Ltd., Kurashiki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,267

[22] Filed: Apr. 24, 1996

[30] Foreign Application Priority Data

Apr. 25, 1995 [JP] Japan ................... 7-100872

[51] Int. Cl.$^6$ .............. H04N 5/64; H04N 9/31; H04N 5/74; G02F 1/00
[52] U.S. Cl. ........................... 348/744; 348/755
[58] Field of Search ..................... 348/744–775; 359/455, 456, 457; H04N 5/64, 9/31, 5/74; G02F 1/00

[56] References Cited

U.S. PATENT DOCUMENTS

| | | |
|---|---|---|
| 4,432,010 | 2/1984 | Oguino ........................... 358/60 |
| 4,701,020 | 10/1987 | Bradley, Jr. ...................... 350/128 |
| 5,020,877 | 6/1991 | Yokoo et al. ..................... 350/128 |
| 5,602,679 | 2/1997 | Dolgoff et al. .................... 348/744 |

*Primary Examiner*—Bryan Tung
*Assistant Examiner*—Nhon T. Diep
*Attorney, Agent, or Firm*—Oblon, Spivak, McClelland, Maier & Neustadt, P.C.

[57] ABSTRACT

A projection type display device comprising a light source for irradiating a light valve, a light valve wherein pixels are arranged in delta matrix, each pixel containing color pixels for the three primary colors and a composite color of red (R), green (G) and blue (B) being displayed on each pixel, a projection lens for projecting the visual images formed on the light valve by receiving the light emitted from the light valve, and a screen including a lenticular lens which has a periodic structure in one direction and on which projected images are formed, which is characterized in that, given the pitch PL of the periodic structure of the lenticular lens and the pitch P of the projected image on the lenticular lens in the direction corresponding to the periodic structure, the pitches PL and P satisfy the equation (1) below when $0.41 < m1 < 0.57$, $$(P/PL) \cdot m1 = n + \tfrac{1}{2} \text{ (provided, } n \text{ is a natural number).} \quad (1)$$

4 Claims, 2 Drawing Sheets

PROJECTION TYPE DISPLAY DEVICE

BACKGROUND OF THE INVENTION

1. Field of the Invention

The present invention relates to a projection type display device wherein optical images formed on a light valve are irradiated by light and are projected on a screen via a projection lens.

2. Disclosure of the Prior Art

As a large size display device for visual images, there have been developed projection type display devices wherein optical images are formed on a small light valve based on visual image signals and irradiated with light and wherein the thus irradiated optical images are enlarged by means of a projection lens to be projected and displayed on a rear projection image display screen. Conventionally, CRTs (cathode-ray tubes) have been used as the light valve, but more recently liquid crystal display panels on which the pixels are arranged in matrix are more frequently used.

Two-sheet screens comprising a combination of a Fresnel lens and a lenticular lens are generally used as the rear projection screen (e.g. U.S. Pat. No. 4,432,010). FIG. 1 is a schematic perspective view showing a rear projection image display device using said two-sheet screen. In FIG. 1, a light valve 2 comprising a liquid crystal display panel is irradiated with the light from an irradiation system 1. Optical images formed on the liquid crystal display panel 2 are enlarged by a projection lens 3, and the enlarged images are formed on a two-sheet screen 6 comprising a Fresnel lens 4 and a lenticular lens 5. The Fresnel lens 4 has functions to direct the incident light toward the viewer. The lenticular lens 5 disperses the light emerging from the Fresnel lens 4 in the horizontal and vertical directions at any desired angles and in any desired ratios.

The pixels in the liquid crystal display panel may be arranged either in stripes or in a delta matrix. FIG. 2 is a schematic plan view to show one embodiment of a liquid crystal display panel wherein each pixel contains three primary colors. In the liquid crystal display panel system with a delta matrix shown in FIG. 2, a composite color of red (R), green (G) and blue (B) is displayed in one LCD pixel. In the liquid crystal display panel with a delta matrix as shown in FIG. 2, one liquid crystal pixel is provided for each of the colors red (R), green (G) and blue (B). As the three colors are combined on the incident side of the projection lens, images are displayed in full color. The liquid crystal display panel system with a delta matrix having this construction is called a three-panel system and is described, for example, in "Optical system of the HDTV rear projector using LCD panels, Kato et al., ITEJ Technical Report Vol. 16, No. 13, pp. 65–70 (1992).

FIG. 3 is a schematic plan view showing an embodiment of a liquid crystal display panel with delta matrix wherein each pixel contains only one color pixel out of the three primary colors. In this type of liquid crystal display panel, one LCD pixel displays one color in red (R), green (G) or blue (B). The liquid crystal display panel with a delta matrix having this construction is called a single-panel system and is described, for example, in "A new bright single panel LCD-projection system without mosaic color filter, Nakanishi et al., ITEJ Technical Report Vol. 19, No. 8, pp. 1–5 (1995). A single-panel system requires a resolution which is three times higher than that for a three-panel system.

When the LCD pixels in the light valve 2 are arranged in a matrix, images enlarged and formed on the screen 6 by the projection type display device will also be arranged in a matrix. If the LCD pixels on the light valve 2 are arranged in stripes, the images on the screen 6 would also be in stripes. If the lenticular lens 5 has a periodic structure in the horizontal direction, moire patterns would appear because of the interference in the spatial frequency between the period of pixel images in delta matrix or in the stripes and the periodic structure of the lenticular lens in the horizontal direction. Moire patterns render the images projected on the screen to be less legible.

Various techniques have been developed to prevent or suppress the effect of moire patterns. For example, Japanese Patent Application Laid-open No. 62-236282 discloses a display device wherein the pitch of pixels of the projected images as against the pitch of the lenticular lens (pitch ratio) is two-fold or less. Japanese Patent Application Laid-open No. 2-97991 discloses a display device wherein the pitch ratio is set so that the longest moire wavelength would be the minimum. More specifically according to the latter technique, the effect of moire patterns is mitigated by selecting the pitch ratio P/PL so that it satisfies n+½ (N; is a positive integer), given the pixel pitch P of the projected image and the pitch PL of the lenticular lens of the screen.

However, when a screen designed according to said prior art method is used for an LCD panel with a certain type of matrix arrangement, highly conspicuous moire patterns have been observed to appear on the screen.

OBJECT AND SUMMARY OF THE INVENTION

The present invention has been conceived in view of the above mentioned problems and aims at providing a projection type display device which gives clear images unaffected by moire patterns.

To achieve the above mentioned object, the projection type display device according to the present invention comprises a light source for irradiating a light valve, a light valve wherein pixels are arranged in a delta matrix, each pixel containing color pixels of the three primary colors so that a composite color of red (R), green (G) and blue (B) is displayed, a projection lens for projecting the visual images formed on the light valve by receiving the light from the light valve, and a screen including a lenticular lens which has a periodic structure in one direction and on which projected images are formed. Given the pitch PL of the periodic structure of the lenticular lens and the pitch P of the projected image on the lenticular lens in the direction corresponding to the periodic structure, then the pitches PL and P satisfy the equation (1) below when $0.41 < m1 < 0.57$, $$(P/PL) \cdot m1 = n + \tfrac{1}{2} \text{ (wherein } n \text{ is a natural number).} \quad (1)$$

Another embodiment of a projection type display device intended to overcome such problem comprises a light source for irradiating a light valve, a light valve wherein pixels are arranged in a delta matrix, each pixel containing a pixel of only one color out of the three primary colors so that only one color of red (R), green (G) or blue (B) is displayed on one pixel, a projection lens for projecting the visual images on the light valve by receiving light from the light valve, and a screen including a lenticular lens which has a periodic structure in one direction and which projected images are formed. Given the pitch PL of the periodic structure of the lenticular lens and the pitch P of the projected image on the lenticular lens in the direction corresponding to the periodic structure, then the pitches PL and P should satisfy the equation (2) below when $1.46 < m2 < 1.59$, $$(P/PL) \cdot m2 = n + \tfrac{1}{2} \text{ (wherein } n \text{ is a natural number).} \quad (2)$$

BRIEF DESCRIPTION OF THE INVENTION

The present invention will be understood more clearly from the following description of the preferred embodiments taken in conjunction with the accompanying drawings. It should be noted that the embodiments and the drawings are given only for illustrative and explanatory purposes and should not be construed to limit the scope of the present invention. The scope of the present invention is defined by the appended claims.

DETAILED DESCRIPTION OF THE INVENTION

Figure 1:
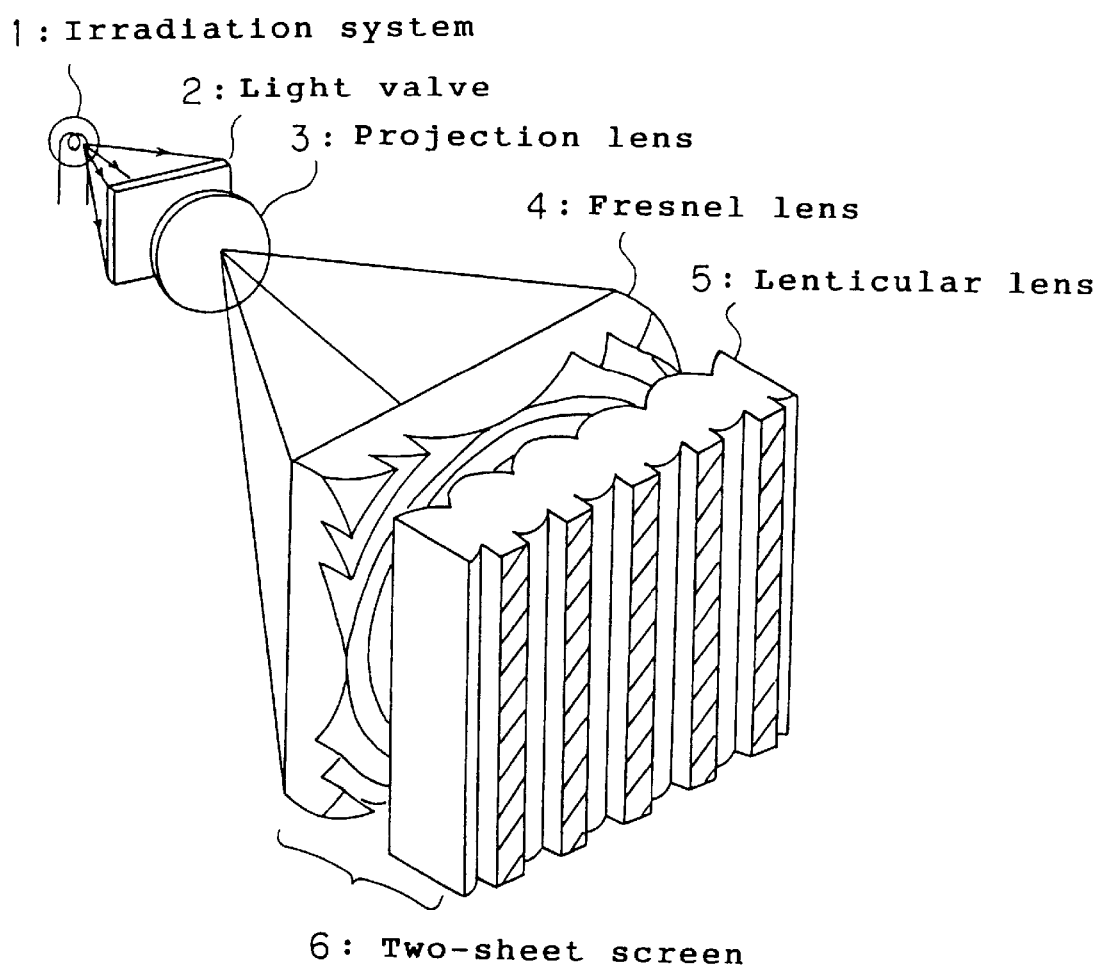
FIG. 1 is a schematic perspective view to show the construction of a projection type display device.

FIG. 1 shows one example of construction for a projection type display device which uses a two-sheet screen comprising a combination of a Fresnel lens and a lenticular lens. In the projection type display device shown in FIG. 1, a light valve 2 comprising an LCD panel is irradiated by an irradiation system 1. Optical images on the LCD panel are enlarged by a projection lens 3 and formed on a two-sheet screen 6 comprising a Fresnel lens 4 and a lenticular lens 5. The construction shown in FIG. 1 is identical with that of the conventional projection type display device.

Figure 2:
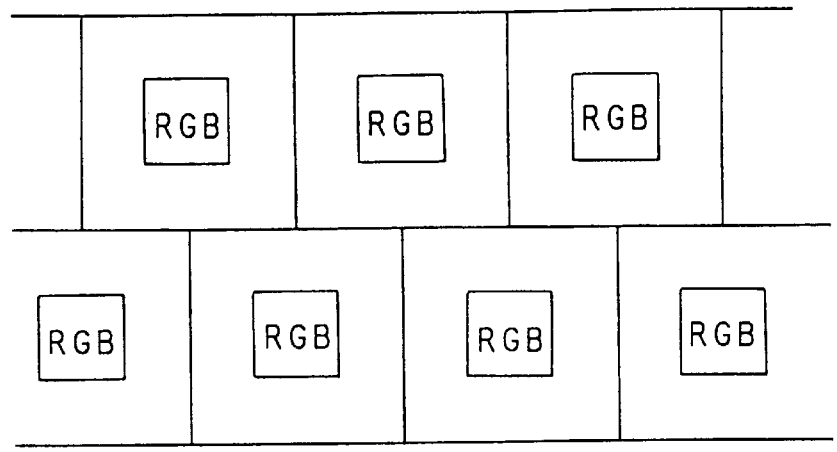
FIG. 2 is a schematic plan view to show a liquid crystal display panel with a delta matrix, of which each pixel contains the three primary-color pixels.

A rear projection type display device having the construction shown in FIG. 1 was fabricated. In the device, the LCD pixels are arranged in a delta matrix as shown in FIG. 2, and the three primary color pixels are arranged in each LCD pixel so that each LCD pixel displays a composite color of red (R), green (G) and blue (B). Table 1 shows the result of moire observation using a lenticular lens with 0.33 mm pitch or with 0.52 mm pitch. A projection lens that can be zoomed was used to vary the pitch of the images projected on the lenticular lens in order to evaluate the effect of the moire patterns as shown in Table 1. Observation of moire patterns was also conducted for projected images of the pixels of which pitches are not given in Table 1, so long as they were within the range shown in the table.

TABLE 1

| n | m | Pitch projected image of the pixel | Pitch, periodic structure of lenticular lens | Moire observation |
|---|---|---|---|---|
| 1 | 0.40 | 1.24 | 0.33 | x |
|   | 0.41 | 1.21 | 0.33 | Δ |
|   | 0.52 | 0.95 | 0.33 | ○ |
|   | 0.57 | 0.87 | 0.33 | Δ |
|   | 0.58 | 0.85 | 0.33 | x |
|   | 0.40 | 1.95 | 0.52 | x |
|   | 0.41 | 1.90 | 0.52 | Δ |
|   | 0.52 | 1.50 | 0.52 | ○ |
|   | 0.57 | 1.37 | 0.52 | Δ |
|   | 0.58 | 1.34 | 0.52 | x |
| 2 | 0.40 | 2.06 | 0.33 | x |
|   | 0.41 | 2.01 | 0.33 | Δ |
|   | 0.52 | 1.59 | 0.33 | ○ |
|   | 0.57 | 1.45 | 0.33 | Δ |
|   | 0.58 | 1.42 | 0.33 | x |
|   | 0.40 | 3.25 | 0.52 | x |

TABLE 1-continued

| n | m | Pitch projected image of the pixel | Pitch, periodic structure of lenticular lens | Moire observation |
|---|---|---|---|---|
|   | 0.41 | 3.17 | 0.52 | Δ |
|   | 0.52 | 2.50 | 0.52 | ○ |
|   | 0.57 | 2.28 | 0.52 | Δ |
|   | 0.58 | 2.24 | 0.52 | x |

Table 1 shows the result of moire observation. The mark O indicates that moire is invisible; Δ indicates that moire is slightly observed but is permissible; and X indicates that moire is conspicuous and is not practically permissible.

As is evident from Table 1, when the equation (1) falls within the range of 0.41m1 <0.57, the effect of the moire patterns poses no practical problem; however, if m1 is 1 as is the case with the prior art, then moire patterns become too conspicuous and are not permissible. It is noted here that the smaller the pitch of the lenticular lens, the more difficult it becomes to process the lens. On the other hand, the greater the pitch of the projected image of the LCD pixels, the lower the resolution becomes. For these reasons, n in the equation (1) is preferably 1 or 2.

Figure 3:
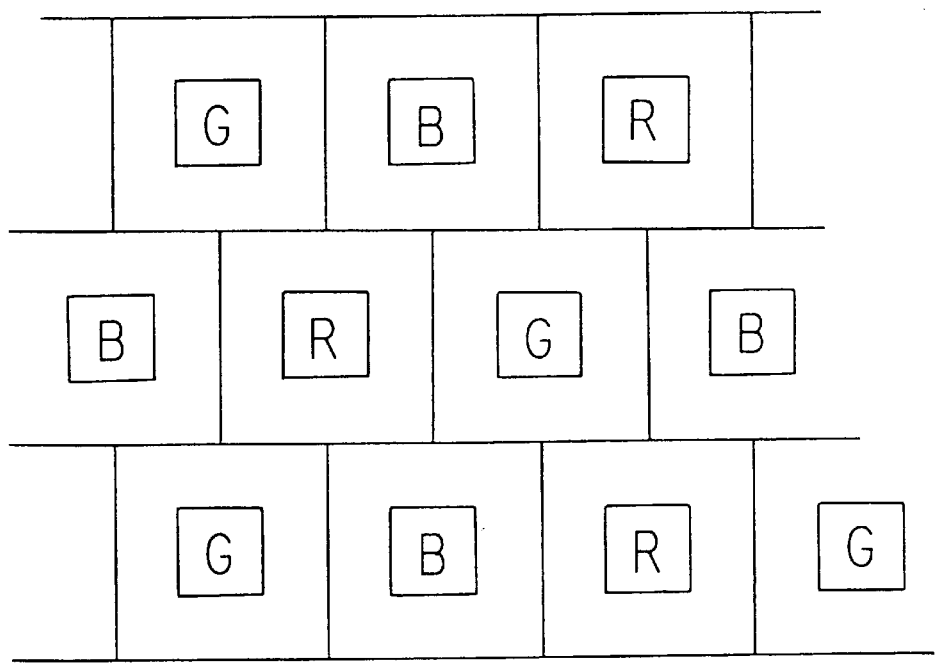
FIG. 3 is a schematic plan view to show a liquid crystal display panel with a delta matrix, of which each LCD pixel contains only one pixel for one of the three primary colors.

A rear projection type display device having the construction as shown in FIG. 1 was fabricated. In the LCD panel of the device, the LCD pixels are arranged in a delta matrix as shown in FIG. 3, and each one of the LCD pixels contains a pixel of only one of the three primary colors so that each of the LCD pixels can display either one of red (R), green (G) or blue (B). Tables 2 and 3 show the result of moire observation using a lenticular lens with 0.33 mm pitch or with 0.52 mm pitch. A projection lens that can be zoomed was used to vary the pitch of the images projected on the lenticular lens in order to evaluate the effect of the moire patterns as shown in Tables 2 and 3. Observation of the moire patterns was also conducted for projected images of the pixels of which pitches are not given in the tables, so long as the pitches were within the range shown in the Tables 2 and 3.

TABLE 2

| n | m | Pitch projected image of the pixel | Pitch, periodic structure of lenticular lens | Moire observation |
|---|---|---|---|---|
| 3 | 1.45 | 0.80 | 0.33 | x |
|   | 1.46 | 0.79 | 0.33 | Δ |
|   | 1.47 | 0.79 | 0.33 | Δ |
|   | 1.48 | 0.78 | 0.33 | ○ |
|   | 1.53 | 0.76 | 0.33 | ○ |
|   | 1.57 | 0.74 | 0.33 | ○ |
|   | 1.58 | 0.73 | 0.33 | Δ |
|   | 1.59 | 0.73 | 0.33 | Δ |
|   | 1.60 | 0.72 | 0.33 | x |
| 3 | 1.45 | 1.26 | 0.52 | x |
|   | 1.46 | 1.25 | 0.52 | Δ |
|   | 1.47 | 1.24 | 0.52 | Δ |
|   | 1.48 | 1.23 | 0.52 | ○ |
|   | 1.53 | 1.19 | 0.52 | ○ |
|   | 1.57 | 1.16 | 0.52 | ○ |
|   | 1.58 | 1.15 | 0.52 | Δ |
|   | 1.59 | 1.14 | 0.52 | Δ |
|   | 1.60 | 1.14 | 0.52 | x |

TABLE 3

| n | m | Pitch projected image of the pixel | Pitch, periodic structure of lenticular lens | Moire observation |
|---|---|---|---|---|
| 4 | 1.45 | 1.02 | 0.33 | x |
|   | 1.46 | 1.02 | 0.33 | Δ |
|   | 1.47 | 1.01 | 0.33 | Δ |
|   | 1.48 | 1.00 | 0.33 | ○ |
|   | 1.53 | 0.97 | 0.33 | ○ |
|   | 1.57 | 0.95 | 0.33 | ○ |
|   | 1.58 | 0.94 | 0.33 | Δ |
|   | 1.59 | 0.93 | 0.33 | Δ |
|   | 1.60 | 0.93 | 0.33 | x |
| 4 | 1.45 | 1.61 | 0.52 | x |
|   | 1.46 | 1.60 | 0.52 | Δ |
|   | 1.47 | 1.59 | 0.52 | Δ |
|   | 1.48 | 1.58 | 0.52 | ○ |
|   | 1.53 | 1.53 | 0.52 | ○ |
|   | 1.57 | 1.49 | 0.52 | ○ |
|   | 1.58 | 1.48 | 0.52 | Δ |
|   | 1.59 | 1.47 | 0.52 | Δ |
|   | 1.60 | 1.46 | 0.52 | x |

Tables 2 and 3 show the result of the moire observation. The mark O indicates that moire is invisible; Δ indicates that moire is slightly observed but is permissible; and X indicates that moire is conspicuous and is not practically permissible.

As is evident from Tables 2 and 3, the LCD panel in which each LCD pixel displays only one of the three primary colors of red (R), green (G) or blue (B) will pose no problems if the equation (2) falls within the range of 1.46<m2<1.59. In the equation (2), n is preferably 3 or 4 in view of the size of the pixel or the pitch of the lenticular lens.

What is claimed is:

1. A projection type display device comprising:
    a light valve wherein pixels are arranged in delta matrix, each pixel containing color pixels for the three primary colors and a composite color of red (R), green (G) and blue (B) being displayed on each pixel;
    a light source for irradiating the light valve;
    a projection lens for projecting the visual image formed on the light valve by receiving the light rays emitted from the light valve; and
    a screen including a lenticular lens, said lenticular lens having a periodic structure in one direction and on which projected images are formed, wherein a pitch PL of the periodic structure of the lenticular lens and a pitch P of the projected image on the lenticular lens in the direction corresponds to the periodic structure, and wherein the pitches PL and P satisfy an equation listed below when $0.41<m1<0.57$, $(P/PL)\cdot m1 = n+\frac{1}{2}$ (where $n$ is a natural number).

2. The projection type display device as claimed in claim 1 wherein n in the equation is either 1 or 2.

3. A projection type image display device comprising:
    a light valve wherein pixels are arranged in delta matrix, each pixel containing only one color pixel for one of the three primary colors and only one color in red (R), green (G) or blue (B) being displayed on one pixel;
    a light source for irradiating the light valve;
    a projection lens for projecting the visual image formed on the light valve by receiving the light emitted from the light valve; and
    a screen including a lenticular lens, said lenticular lens having a periodic structure in one direction and on which projected images are formed, wherein a pitch PL of the periodic structure of the lenticular lens and a pitch P of the projected image on the lenticular lens in the direction corresponds to the periodic structure, and wherein the pitches PL and P satisfy an equation listed below when $1.46<m2<1.59$, $(P/PL)\cdot m2 = n+\frac{1}{2}$ (where $n$ is a natural number).

4. The projection type display device as claimed in claim 3 wherein n in the equation is either 3 or 4.

* * * * *